United States Patent [19]

Smith

[11] 4,034,853
[45] July 12, 1977

[54] STRIP OR ROLL OF PLASTIC FILM GLOVES

[76] Inventor: Buford Bryan Smith, P.O. Box 3353, 109 N. Duncan Road, Champaign, Ill. 61820

[21] Appl. No.: 568,677

[22] Filed: Apr. 16, 1975

[51] Int. Cl.² .................. B65D 85/66; B65D 85/67
[52] U.S. Cl. .................................... 206/278; 2/169; 242/55.53; 206/390; 206/494; 206/820; 428/43; 428/906; 428/542; 156/251
[58] Field of Search ........... 2/159, 167, 169, 243 B; 428/35, 36, 43, 906, 136, 131, 132, 137; 206/389, 390, 278, 494, 812, 820; 156/251, 252; 242/55.53

[56] References Cited

U.S. PATENT DOCUMENTS

| 2,780,352 | 2/1957 | Schroeder | 206/389 |
| 3,229,875 | 1/1966 | Stoller | 225/49 X |
| 3,441,198 | 4/1969 | Ericson | 229/53 |
| 3,583,558 | 6/1971 | Davis | 206/390 X |
| 3,729,367 | 4/1973 | Shore et al. | 428/43 |
| 3,735,865 | 5/1973 | Smith | 206/390 |
| 3,851,760 | 12/1974 | Smith | 206/390 X |
| 3,920,500 | 11/1975 | Brieske | 428/35 X |

Primary Examiner—George F. Lesmes
Assistant Examiner—Henry F. Epstein
Attorney, Agent, or Firm—Neal J. Mosely

[57] ABSTRACT

Disposable plastic film gloves are prepared from strip film material in two layers which are heat sealed in the outline of the five fingers of a glove and simultaneously die cut to remove the material between the fingers and to the side and base of the respective gloves. The gloves are formed in a strip with the three center fingers of each glove fitting the curved base or wrist opening of the adjacent glove. The heat seal at the fingers adjacent to the wrist opening of the next glove is arranged with a perforation or serration outside the heat sealed portion in the wrist portion of the succeeding glove. This structure permits a strip of gloves to be rolled or provided in reversed overlapping layers for continuous dispensing and permits each glove to be pulled off from the succeeding one with all of the intermediate portions cut out and the wrist opening completely open and ready for use.

4 Claims, 3 Drawing Figures

STRIP OR ROLL OF PLASTIC FILM GLOVES

BACKGROUND OF THE INVENTION

1. Field of the Invention

This invention relates to new and useful improvements in disposable plastic film gloves. More particularly, the invention relates to plastic film gloves manufactured in strip form with all of the material between the fingers and to the side and base of the gloves cut out and the fingers of one glove connected to the wrist openings of the succeeding glove by a perforated portion arranged to permit the easy separation of one glove from the next. The strip of gloves, for convenience, may be stored in rolls or in overlapping reversed layers in a dispensing carton for easy dispensing of separate gloves from the strip.

2. Description of the Prior Art

Disposable plastic film gloves are well known in the prior art. Gloves of this type are prepared by heat sealing the periphery of two plastic films in the outline of the glove and die cutting the plastic material to the shape of the glove leaving a glove consisting of two layers of plastic film sealed at its periphery and open at the wrist for insertion of the hand. The glove may have all of the fingers if desired or may be in the form of a mitten structure having only a thumb. In the past, disposable plastic film gloves have usually been die cut separately and stored in separate boxes, usually designed for easy removal of the individual gloves for use. Smith, U.S. Pat. No. 3,735,865 discloses a dispensing carton for plastic film gloves and other sheet form objects which is designed for easy dispensing of the object packaged. There is a commercial objection to the die cutting and packaging of individual plastic film gloves, however, in that an excessive amount of labor is required in the handling and packaging of the individual gloves. As a result, there has been a need for a suitable design of plastic film gloves in the form of a continuous strip from which the individual gloves may be pulled apart or separated easily for use. This reduces the labor of packaging and shipping of the gloves by a very substantial amount.

There are a large variety of prior art references, patents and otherwise, which disclose disposable items of various sorts in strip or roll form and perforated for ease of dispensing and separation. Buford B. Smith, U.S. Pat. Nos. 3,851,760 and 3,735,865 disclose plastic film aprons in a dispensing roll arangement. The prior art of record against each of those patents is pertinent to the general suggestion of the concept of providing sheet form articles in dispensing rolls or packages and perforated for separating one item from another. The prior art, however, is primarily concerned with the dispensing of sheet form articles in a form where the shape of the article is conducive of the easy separation of the distinct articles without the necessity of tearing away separate portions to make the article useful. Thus, it is relatively easy to provide bibs or aprons or the like in dispensing rolls or strips since these items can be constructed in a way that when separated there is no further portion to be removed to make the item operable. Stroller U.S. Pat. No. 3,229,875 discloses a dispensing carton for a variety of types of sheet form material. The various items suggested include plastic film aprons, bibs, socks, panties, and gloves. In the case of sheet form gloves, however, the gloves are arranged for seperation along perforated lines and it is necessary to tear away the portion around the fingers of the gloves and to separate the individual fingers to make the gloves useful. This extra effort on the part of the user essentially negates the advantage of supplying the gloves in a roll or strip form.

STATEMENTS OF OBJECTS AND FEATURES OF THE INVENTION

It is therefore, one object of this invention to provide a new and improved product consisting of a plurality of plastic film disposable gloves in strip form perforated for easy separation of one glove from the next.

Another object of this invention is the provision of an improved strip of disposable plastic film gloves having certain of the fingers of one glove secured integrally with the wrist opening of the next glove in the strip and arranged for easy separation.

A feature of this invention is the provision of new and improved disposable glove of plastic film stock in strip form heat sealed around the periphery of fingers and with the material between the fingers and around the glove being die cut away and at least part of the fingers of one glove secured to the wrist opeing of the next adjacent glove in the strip and perforated outside the heat sealed portion to permit the separation of the gloves while leaving the wrist area open for use.

Other objects and features of this invention will become apparent from time to time throughout the specification and claims as hereinafter related.

SUMMARY OF THE INVENTION

This invention comprises a new and improved disposable glove formed form two strips of plastic film stock and heat sealed around the edge of the hand and fingers of the glove and open across the base. The gloves are heat sealed and die cut simultaneously to remove the material between the fingers and around the edges and leaving two or three of the fingers connected to the wrist opening of the next succeeding glove in the strip and the wrist portion being perforated to make the separation of one glove from the next without opening the heat seal of the adjacent finger and leaving the wrist portion open for immediate use. A strip of gloves prepared in this manner may be packaged in overlapping folds in a dispensing package so that the gloves may be pulled out individually. Alternatively, the strip of gloves may be rolled on a dispensing roll provided that the gloves are rolled in the direction of the wrist opening rather than in the direction of the fingers. The dispensing roll may be secured in any suitable dispensing cartons so that the gloves may be pulled out and separated from the strip individually and ready for immediate use.

DESCRIPTION OF THE PREFERRED EMBODIMENTS

Figure 1:
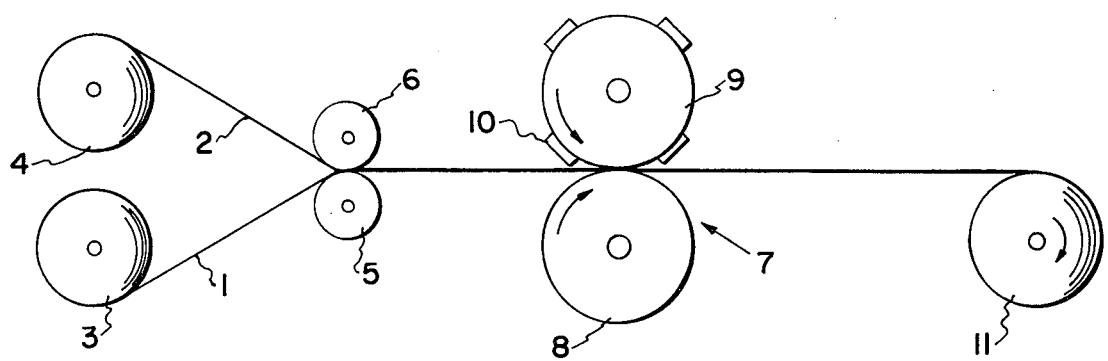
FIG. 1 is a schematic view showing the feeding of separate strips of plastic film into a conventional apparatus comprising a pair of rolls of simultaneous heat sealing and die cutting of the strip of gloves and storing the strip on a storage roll.

Referring to the drawings by numerals of reference and more particularly to FIG. 1, there is shown a preferred embodiment of the invention in which a plurality of disposable plastic film gloves are prepared from plastic film materials in strip form and stored on a roll. In FIG. 1, plastic film is fed in two separate layers 1 and 2 from storage rolls 3 and 4, respectively. The layers of film 1 and 2 are passed between combining rolls 5 and 6 to bring the layers of film in close juxaposition. The double layer of film is then passed through a die cutting and heat sealing apparatus illustrated schematically as 7. The apparatus 7 comprises a pair of die cutting and sealing rolls 8 and 9. Roll 8 is smooth and roll 9 has a plurality of knife edges and sealing bars shown schematically as 10. The cutting and sealing members 10 on roll 9 are arranged in the outline of the glove and include a cutting edge and a sealing portion designed to cut the gloves in the desired outline. Apparatus of this type is conventional in construction and well known in the art of manufacture of plastic film articles in which the articles are simultaneously cut and sealed. The gloves are cut so that all of the material is removed from around the periphery of the gloves and the gloves are kept in a continuous strip which is wound on storage reel 11. The sealing and cutting rolls 8 and 9 are rotated as indicated by the directional arrows on those rolls. The strip of gloves is rolled up on storage roll 11 in the direction of the directional arrow. It is necessary that the strip of gloves be rolled with the wrist opening being wound first on the storage roll 11. If it is attempted to roll the gloves in the opposite direction the outer fingers will fold under and interfere with the winding operation.

Figure 2:
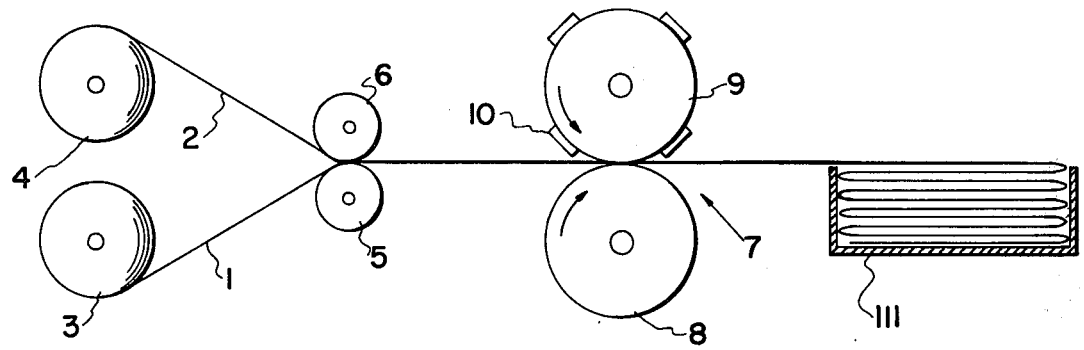
FIG. 2 is a schematic view similar to FIG. 1 in which the strip of plastic film gloves are stored in reversed overlapped layers in a dispensing carton.
Figure 3:
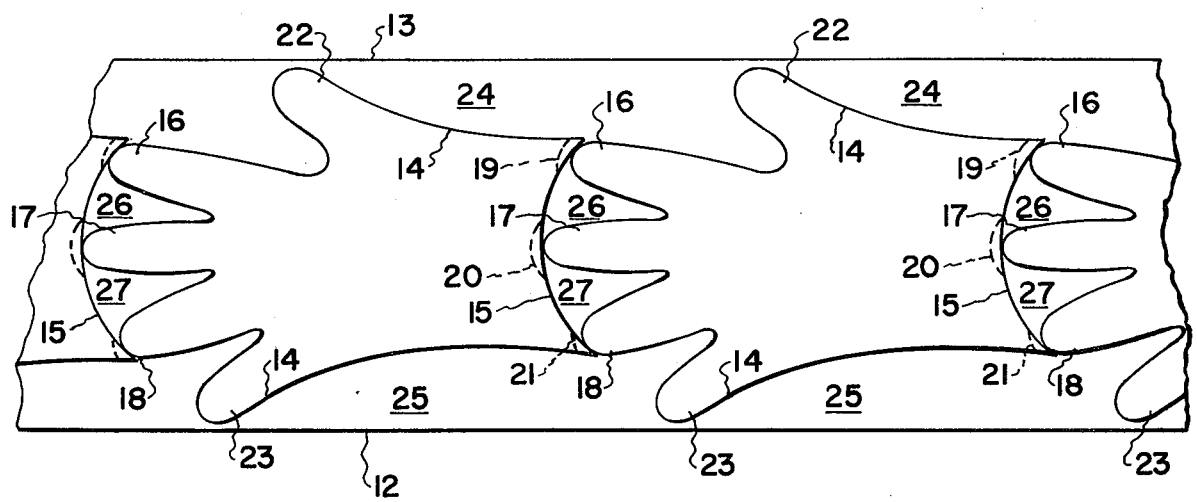
FIG. 3 is a detail plan view of a portion of the strip of plastic film glove illustrating the cutting away of the portion of the plastic film to be removed, the heat sealing of the outline of the individual glove and the perforated connection of the fingers of one glove to wrist opening of the next.

In FIG. 3, there is shown a plan view of a portion of the strip of plastic film glove produced in the process and apparatus illustrated schematically FIG. 1 (and in FIG. 2). In this view, the lines 12 and 13 illustrate the edges of the superimposed film strips 2 and 1 which are combined to form the strip of plastic film glove. The line 14 is a continuous curved line outlining the side of the wrist, thumb, and fingers of the glove and represents the line along which the plastic films are sealed together with the material just outside the seal being cut through by the die cutting portion of the cutting and sealing rolls. The line 15 illustrates a curved wrist opening at the base of each successive glove which is not sealed except at the points where it is touched by fingers 16, 17, and 18 of the next adjacent glove. The fingers 16, 17, and 18 are sealed completely around their respective ends at the point where those fingers join to the wrist opening 15 of the next adjacent glove. The wrist portion of each glove is perforated along lines 19, 20, and 21 by an interrupted cutting bar or perforating bar to provide a line along which the gloves may be separated. The amount of material that can be torn away when the gloves are separated along lines 19, 20 and 21 is slightly exaggerated in FIG. 3 to illustrate the construction more clearly. Actually, the perforated tear lines 19, 20 and 21 are positioned just outside the heat seal closing the end of fingers 16, 17, and 18, respectively, in the base of the next succeeding glove so that the fingers of one glove may be torn away from the base or wrist opening of the next glove to separate the gloves and leaving the wrist portion open for use.

In heat sealing an cutting the gloves, as shown in FIG. 3, it is seen that the thumb 22 and little finger 23 extend almost to the edges of the plastic material. The edge portions of the plastic material 24 and 25 which lie between the side portions of the glove and the edge of plastic film are die cut at the time the periphery glove is heat sealed and that material is removed, perferably as a continuous strip, in the cutting operation. At the same time the material in the spaces 26 and 27 between fingers 16 and 17 and fingers 17 and 18, respectively, is cut away in the die cutting operation and drops away from the glove which is formed. Thus, the glove leaves the die cutting and heat sealing rolls 8 and 9 in FIG. 1 in the form of a strip of gloves which are fully formed and sealed around their entire periphery except for the wrist opening indicated by the wrist line 15. The fingers 16, 17, and 18 are sealed at their end portions where they join to the wrist line 15 of the next adjacent glove but the wrist portion of the next glove is perforated along lines 19, 20, and 21, respectively, so that the gloves may be easily pulled apart leaving the wrist completely open for immediate use of the glove. In the embodiment of the invention shown in FIG. 1, the strip of plastic film gloves, as shown in FIG. 3, is wound on storage roll 11 in the direction of the directional arrow on that roll with the wrist of the glove being rolled onto the roll first. As noted above, it is absolutely necessary that the gloves be rolled wrist first to prevent the fingers from being folded under and interferring with the rolling operation. Of course, it would be possible to roll the strip of gloves the opposite direction if some form of supporting or backing strip were provided but this would add substantially to the complexity and cost of preparation of the gloves. The roll of gloves produced in the embodiment shown schematically in FIG. 1 may be dispensed from any suitable support for the roll, such as the dispensing roll for plastic film aprons illustrated in applicant's U.S. Pat. Nos. 3,851,760 and 3,735,865.

In FIG. 2 of the drawings, there is shown an alternate embodiment of the invention which differs from FIG. 1 only in the means for storing the strip of plastic film gloves produced. In this embodiment, strips 1 and 2 of plastic films are fed from storage rolls 3 and 4 and are combined by combining rolls 5 and 6 as in FIG. 1. The two layers of plastic film are then passed through the die cutting and sealing apparatus 7 comprising cutting and sealing rolls 8 and 9. The gloves are cut and sealed with fingers 16, 17, and 18 joined to wrist portion 15 of the next adjacent glove as shown in FIG. 3 and described in more detail in connection with the embodiment shown in FIG. 1. The strip of gloves which comes from the cutting and sealing apparatus 7 is stored in overlapping reversing layers in a suitable storage box or carton 111. This carton or box may be of any suitable design and is preferably arranged with an opening through which the strip of gloves may be pulled and torn apart from the torn apart from the next adjacent glove as required.

The platic film used in the manufacture of these gloves may be of any suitable type and is selected largely on economic considerations. Generally, polyethylene film is most economical and suitable for the purpose. However, other suitable plastic films, such as polyvinyl chloride, vinylidene chloride copolymers, rubber hydrochloride, polyesters, etc. may be used.

The thickness of the film used in manufacturing the gloves is depended strictly upon the toughness of the film and the type of wear or use to which the film gloves may be put. The films used in the manufacture of the gloves therefore may be of any suitable size varying from a fraction of a mil in thickness up to several mils, perhaps as heavy as 5 or 10 mils, in thickness. Usually, the film having a thickness of 1 or 2 mils is adequate for the purpose.

In the description given above, with reference to the three figures of drawings, there is illustrated a single preferred embodiment of the manufacture of the strip of plastic film gloves and two embodiments of the means for storing the strip of gloves for dispensing for use. It will be obvious to one of ordinary skill in the art that numerous modifications of the disclosed invention are possible without departing from the scope and intent of the invention. For example, the invention is concerned with the die cutting and heat sealing of a double thickness of plastic film to produce a strip of plastic film gloves as illustrated. The double thickness of plastic film may be obtained by unrolling separate layers of film from separate storage rolls as illustrated in FIGS. 1 and 2 or may be supplied from a single storage roll of "double wound" film. Double wound film is available commercially and may be used in the production of gloves in accordance with this invention but has the slight disadvantage that the film has some tendency to adhere to each other with the result that it may be slightly difficult for the gloves to be opened. Another fairly obvious modification of the invention involves the point at which the fingers of the glove are attached to the wrist of the next glove. In the preferred embodiment, the wrist of each glove is cut along an arcuate line and the three central fingers of the glove fit against the arcuate wrist portion with the perforated tear lines being in the wrist portion just beyond the line of seal at the end of the fingers. It should be obvious that the fingers could actually extend into the wrist portion of the next adjacent glove so long as a perforated tear line is provided in the unsealed wrist portion of the glove and outside the sealed end of the fingers. This permits the fingers to be torn from the wrist portion of the next adjacent glove, leaving the wrist portion completely open for use. Such an embodiment would be somewhat messy and would not be considered attractive from a commercial standpoint.

While this invention has been described fully and completely, as required by the Patent Statutes, with reference to preferred embodiments, it should be understood within the scope of the appended claims the invention may be practiced otherwise than as specifically described and shown herein.

I claim:

1. A strip of plastic film gloves having separated thumb and fingers comprising two layers of plastic film heat sealed around the periphery of each glove to seal together the sides thereof and the periphery of each finger while leaving the wrist opening completely unobstructed and open, said strip being die cut to remove all of the film from the edges of each glove to the edges of the film layers and all of the film between the separated fingers of the respective gloves, and a plurality of fingers of each glove being severably connected to the wrist portion of the next adjacent glove whereby the gloves may be separated outside the peripheral seal of such fingers.

2. A strip of plastic film gloves in accordance with claim 1 in which the wrist portion of each glove is provided with a perforated tear line adjacent to and outside of the heat seal of the finger portions of the next adjacent glove thereto.

3. A strip of plastic film gloves in accordance with claim 2 wound on a storage or dispensing roll with the wrist of each glove fed onto the roll in the direction of winding rotation thereof.

4. A strip of plastic film gloves in accordance with claim 2 stored in reversed overlapping layers in a storage or dispensing carton.

* * * * *